UNITED STATES PATENT OFFICE.

JOSÉ F. NAVARRO, OF NEW YORK, N. Y.

PROCESS OF MANUFACTURING HYDRAULIC CEMENT.

SPECIFICATION forming part of Letters Patent No. 464,515, dated December 8, 1891.

Application filed December 18, 1890. Serial No. 375,075. (No specimens.)

*To all whom it may concern:*

Be it known that I, JOSÉ F. NAVARRO, a citizen of Spain, residing at New York, in the county of New York and State of New York, have invented certain new and useful Improvements in Processes for Manufacturing Portland and other Hydraulic Cements; and I do hereby declare the following to be a full, clear, and exact description of the invention, such as will enable others skilled in the art to which it appertains to make and use the same.

My invention relates to a process for the manufacture of Portland cement from the natural rock—that is, natural rock containing silica, lime, and alumina in their proper proportions.

Nearly all the stone in use in the manufacture of hydraulic cement are deficient or in excess of the ingredients named, and are usually magnesia limestone or the so-called "water-limestones," such as at Louisville, Kentucky, the Rosendale, at Rondout, New York, and others of the same general constituents and character. These are burned and ground and form the ordinary hydraulic cements of commerce, which set more or less quickly under water, but never attain a high tensile or breaking strain, because they are never true double silicates of lime and alumina. Moreover, such cements rapidly deteriorate in air, and in surface work quickly scale off. Again, such cements are not Portland cements, as the Portlands are true double or triple silicates, set firmly in water or air, and yield high breaking and tensile strains.

The manufacture of Portland cement from chalk or limestone or argillaceous rock or shales is now done as follows: First. If argillaceous rock is used, it is burned as it is quarried in ordinary stationary vertical kilns without any previous grinding or compounding of the rock. Second. It may be ground and compounded with other substances, such as silica or alumina, then made into lumps by mixing with water, and then burned in the ordinary Portland-cement kiln. In these different ways and with these different materials, natural or artificial, whether made into a paste, lumps, bricks, or briquettes, it is evident that such lumps and bricks require handling and cost of drying before they can be placed in the kiln. There are two burnings—one to dry out and one to calcine. There are, usually, also two grindings or pulverizations—first, to get the raw stone into the necessary condition for forming the lumps or bricks, as described, and, next, the final pulverization after calcination.

It will be noted that in any event, and however mixed or formed, they are burned in the single vertical kiln. It will be further noted that the expense of grinding the raw rock before burning (in order that the lumps or bricks may be formed) is a very expensive one, requiring a series of rock crushers and pulverizers. The handling, cost, and wear and tear of the machinery in grinding raw unburned rock form one of the large items of expense in the manufacture.

In my process I use two kilns—a vertical and a horizontal rotating kiln; and the process consists in taking the raw stone just as it comes from the quarry and first burning it in a vertical stationary kiln. During this burning the carbonic acid and water of crystallization are driven off and the resultant product rendered soft, friable, and easily ground without friction in the pulverizer. A partial silicate of lime and alumina is also formed. This material is next pulverized to an impalpable powder and calcined in a horizontal rotating kiln. During this operation the particles are in constant agitation and admixture, and it is here and during this final calcination that the chemical reaction for the double silicate of lime and alumina takes place. The infinitesimal particles, moving among themselves under the high calcining heat, react upon each other and form grains, which upon being analyzed yield a true double silicate of lime and alumina, having a tensile strength of from five hundred to six hundred pounds, in seven days. If, upon analysis of the first-burned stone, any required element is deficient, it is added in this powder for the second calcination or vitrification. This has not been done, and is evidently impossible to do in any other form of manufacture. The product obtained is finally pulverized, and there is not only a true Portland cement obtained, yielding the highest tests, but the cost of manufacture is very greatly reduced.

Having thus described my invention, what I claim is—

The process of manufacturing Portland cement, which consists in first burning the raw unground rock in a vertical stationary kiln, next pulverizing the burned product, then adding any required additional element, then vitrifying or calcining the pulverized material in a rotating horizontal kiln, and finally pulverizing the latter product.

In testimony whereof I affix my signature in presence of two witnesses.

JOSÉ F. NAVARRO.

Witnesses:
T. E. SOTOLONGO,
V. K. SPEAR.